(12) United States Patent
Zhang et al.

(10) Patent No.: US 11,081,108 B2
(45) Date of Patent: Aug. 3, 2021

(54) INTERACTION METHOD AND APPARATUS

(71) Applicant: Baidu Online Network Technology (Beijing) Co., Ltd., Beijing (CN)

(72) Inventors: Mengmeng Zhang, Beijing (CN); Zhongji Fan, Beijing (CN); Lei Shi, Beijing (CN); Li Wan, Beijing (CN); Qiang Ju, Beijing (CN); Chao Yin, Beijing (CN); Wei Shen, Beijing (CN); Jian Xie, Beijing (CN); Ran Xu, Beijing (CN); Jingya Wang, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 252 days.

(21) Appl. No.: 16/455,958

(22) Filed: Jun. 28, 2019

(65) Prior Publication Data
US 2020/0013400 A1 Jan. 9, 2020

(30) Foreign Application Priority Data

Jul. 4, 2018 (CN) .......................... 201810725631.8

(51) Int. Cl.
*G10L 15/22* (2006.01)
*G06F 16/2452* (2019.01)
(Continued)

(52) U.S. Cl.
CPC .......... *G10L 15/22* (2013.01); *G06F 16/2452* (2019.01); *G06F 40/295* (2020.01);
(Continued)

(58) Field of Classification Search
CPC ................. G10L 15/1815; G10L 15/22; G10L 2015/088; G10L 2015/223;
(Continued)

(56) References Cited

U.S. PATENT DOCUMENTS 5,860,059 A * 1/1999 Aust ...................... H04M 3/493
704/231
8,527,489 B1 * 9/2013 Li ........................ G06F 16/9535
707/706
(Continued)

FOREIGN PATENT DOCUMENTS

CN 107452378 A 12/2017
CN 108153904 A 6/2018
(Continued)

OTHER PUBLICATIONS

English Translation of Notice of Reasons for Refusal for JP Application JP 2019-122909, dated Feb. 16, 2021 (Year: 2021).*
(Continued)

*Primary Examiner* — Eric Yen
(74) *Attorney, Agent, or Firm* — Nixon Peabody LLP (57) ABSTRACT

Embodiments of the present disclosure disclose an interaction method and apparatus. A specific embodiment of the method includes: generating, in response to determining that a request input by a user satisfies a guiding condition, guiding information, and feeding back the guiding information to the user, the guiding condition including one of the following: associating with a plurality of query intents, or associating with no query intent; and generating, based on the request and a feedback input by the user corresponding to the guiding information, an intent-clear request, and feeding back push information bound with the intent-clear request to the user. Realizing that in the process of interacting with the user, for conditions such as the request input by the user is associated with a plurality of query intents or
(Continued)

incompleteness, an intent-clear request associated with an explicit query intent is determined through the interaction with the user.

20 Claims, 4 Drawing Sheets

(51) Int. Cl.
*G06F 40/295* (2020.01)
*G06F 40/30* (2020.01)
*G10L 15/18* (2013.01)
*H04L 29/08* (2006.01)
*G10L 15/08* (2006.01)

(52) U.S. Cl.
CPC .......... *G06F 40/30* (2020.01); *G10L 15/1815* (2013.01); *H04L 67/26* (2013.01); *G10L 2015/088* (2013.01); *G10L 2015/223* (2013.01); *G10L 2015/225* (2013.01)

(58) Field of Classification Search
CPC .......... G10L 2015/225; G06F 16/2452; G06F 40/295; G06F 40/30; H04L 67/26
See application file for complete search history.

(56) References Cited

U.S. PATENT DOCUMENTS

| | | | | |
|---|---|---|---|---|
| 9,009,046 | B1* | 4/2015 | Stewart | G10L 15/08 704/251 |
| 10,277,743 | B1* | 4/2019 | Agarwal | G10L 15/1815 |
| 10,388,277 | B1* | 8/2019 | Ghosh | G10L 15/22 |
| 10,922,493 | B1* | 2/2021 | Das | G06F 40/30 |
| 2002/0160772 | A1* | 10/2002 | Gailey | G06F 16/3344 455/428 |
| 2006/0013487 | A1* | 1/2006 | Longe | G06F 40/232 382/229 |
| 2006/0235694 | A1* | 10/2006 | Cross | G06F 16/95 704/270.1 |
| 2008/0104037 | A1* | 5/2008 | Bierner | G06F 16/3322 |
| 2008/0109212 | A1* | 5/2008 | Witbrock | G06F 16/345 704/9 |
| 2009/0012778 | A1* | 1/2009 | Feng | G06F 16/3338 704/9 |
| 2009/0150156 | A1* | 6/2009 | Kennewick | G10L 15/00 704/257 |
| 2011/0184730 | A1* | 7/2011 | LeBeau | G10L 15/30 704/201 |
| 2012/0016678 | A1* | 1/2012 | Gruber | G06F 9/54 704/275 |
| 2013/0282702 | A1* | 10/2013 | Zhu | G06F 16/3322 707/723 |
| 2013/0332438 | A1* | 12/2013 | Li | G06F 16/9535 707/706 |
| 2014/0272821 | A1* | 9/2014 | Pitschel | G09B 19/06 434/157 |
| 2014/0316764 | A1* | 10/2014 | Ayan | G10L 15/22 704/9 |
| 2014/0344261 | A1* | 11/2014 | Navta | G06F 16/951 707/723 |
| 2015/0193542 | A1* | 7/2015 | Colcernian | G06F 16/9038 707/723 |
| 2015/0340033 | A1* | 11/2015 | Di Fabbrizio | G10L 15/22 704/254 |
| 2017/0010859 | A1* | 1/2017 | Hirai | G10L 15/22 |
| 2017/0140041 | A1* | 5/2017 | Dotan-Cohen | G06Q 10/101 |
| 2017/0242886 | A1* | 8/2017 | Jolley | G06F 40/205 |
| 2017/0256256 | A1* | 9/2017 | Wang | G10L 15/26 |
| 2017/0357637 | A1* | 12/2017 | Nell | H04L 12/2823 |
| 2018/0176269 | A1* | 6/2018 | Griffin | H04L 65/403 |
| 2019/0005950 | A1* | 1/2019 | Jing | G10L 15/1822 |

FOREIGN PATENT DOCUMENTS

| | | |
|---|---|---|
| JP | H04-182857 A | 6/1992 |
| JP | 2001249685 A | 9/2001 |
| JP | 2011150682 A | 8/2011 |

OTHER PUBLICATIONS

English Translation of Written Opinion for JP Application JP 2019-122909, dated Dec. 9, 2020 (Year: 2020).*

English Translation of Notice of Reasons for Refusal for JP Application JP 2019-122909, dated Aug. 18, 2020 (Year: 2020).*

English Translation of Search Report by Registered Search Organization for JP Application JP 2019-122909, dated Aug. 11, 2020 (Year: 2020).*

* cited by examiner

INTERACTION METHOD AND APPARATUS

CROSS-REFERENCE TO RELATED APPLICATIONS

This application claims priority to Chinese Patent Application No. 201810725631.8, filed with the China National Intellectual Property Administration (CNIPA) on Jul. 4, 2018, the content of which is incorporated herein by reference in its entirety.

TECHNICAL FIELD

The present disclosure relates to the field of computer, specifically to the field of interaction, and more specifically to an interaction method and apparatus.

BACKGROUND

Interacting with a user by means of such as voice and feeding desired information back to the user are basic functions of smart devices. At present, the general interaction process is: when a user desires to acquire information of a certain aspect, the user inputs a request associated with the query intent; if the query intent can be determined through the request, information fed back to the user is determined according to the query intent, and the determined information is fed back to the user; if the query intent cannot be determined through the request, no information is fed back to the user.

SUMMARY

Embodiments of the present disclosure provide an interaction method and apparatus.

In a first aspect, the embodiments of the present disclosure provide an interaction method, including: generating, in response to determining that request input by a user satisfies a guiding condition, guiding information, and feeding back the guiding information to the user, the guiding condition including one of the following: associating with a plurality of query intents, or associating with no query intent; and generating, based on the request and a feedback input by the user corresponding to the guiding information, an intent-clear request, and feeding back push information bound with the intent-clear request to the user.

In a second aspect, the embodiments of the present disclosure provide an interaction apparatus, including: a response unit, configured to generate, in response to determining that request input by a user satisfies a guiding condition, guiding information, and feed the guiding information to back the user, the guiding condition including one of the following: associating with a plurality of query intents, or associating with no query intent; and a feedback unit, configured to generate, based on the request and a feedback input by the user corresponding to the guiding information, an intent-clear request, and feed push information bound with the intent-clear request back to the user.

The interaction method and apparatus provided by the embodiments of the present disclosure, generate, in response to determining that request input by a user satisfies a guiding condition, guiding information, and feed the guiding information back to the user, the guiding condition including one of the following: associating with a plurality of query intents, or associating with no query intent; and generate, based on the request and a feedback input by the user corresponding to the guiding information, an intent-clear request, and feed push information bound with the intent-clear request back to the user. The interaction method and apparatus realize that in the process of interacting with the user, for conditions such as the request input by the user is associated with a plurality of query intents or incompleteness, an intent-clear request associated with an explicit query intent is determined through the interaction with the user. The intent-clear request is used to acquire corresponding push information feedback to the user, thereby improving the accuracy of feeding back information that the user desires to acquire in the process of interacting with the user.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
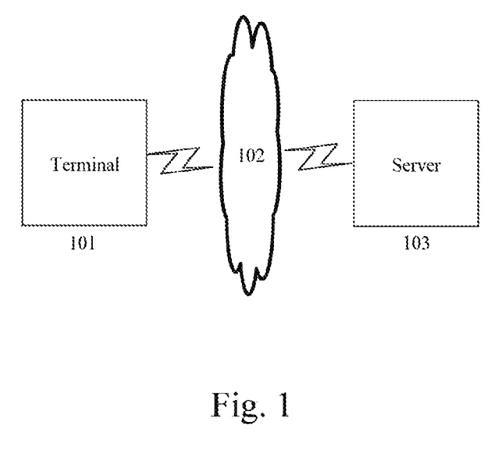
FIG. 1 illustrates an exemplary system architecture adapted to implement the embodiments of the present disclosure.

With reference to FIG. 1, an exemplary system architecture adapted to implement the embodiments of the present disclosure is illustrated.

As shown in FIG. 1, a terminal 101, a network 102, and a server 103. The network 102 may be a wired communication network or a wireless communication network.

The terminal 101 may be a smart device, a smart phone, a tablet computer, or an vehicle-mounted terminal. When the user needs to acquire information of a certain aspect, the user inputs a request at the terminal 101. The user may input the request by voice. The request input by the user of the terminal 101 at the terminal 101 is sent to the server 103. The server 103 may determine whether the request input by the user satisfies a guiding condition. If it is determined that the request input by the user satisfies the guiding condition, guiding information may be generated, and the guiding information is sent to the terminal 101 and fed back to the user by the terminal 101. The user may input a feedback. The terminal 101 may send the feedback input by the user to the server. The server 103 may generate an intent-clear request based on the request and the feedback input by the user corresponding to the guiding information, and feed push information bound with the intent-clear request back to the terminal 101. The push information is fed back to the user by the terminal 101.

Figure 2:
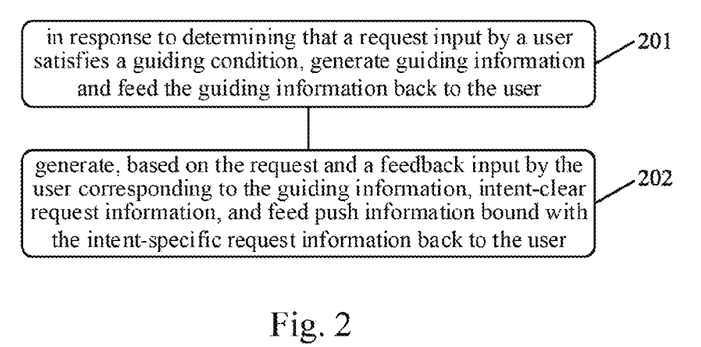
FIG. 2 illustrates a flowchart of an embodiment of an interaction method according to the present disclosure.

With reference to FIG. 2, a flow of an embodiment of an interaction method according to the present disclosure is illustrated. The method includes the following steps:

Step 201, generating, in response to determining that a request input by a user satisfies a guiding condition, guiding information, and feeding back the guiding information to the user.

In the present embodiment, the guiding condition includes one of the following: the request input by the user is associated with a plurality of query intents, or associated with no query intent.

In the present embodiment, the user may input a request at the terminal, and the terminal may send the request to the server. The server may determine whether the request input by the user satisfies a guiding condition. When it is determined that the request is not bound with push information, it may be determined that the request is not associated with a query intent, and then it may be determined that the guiding condition is satisfied. If the request is not bound with a plurality of pieces of push information, it may be determined that the request input by the user is associated with a plurality of query intents, and then it may be determined that the guiding condition is satisfied.

In some alternative implementations of the present embodiment, the request includes one of the following: an information query request, a multimedia content request, or a call request. The information query request is associated with the user's desire to acquire information of a common type such as weather, traffic, or life. The multimedia content request is associated with the user's desire to acquire multimedia content. The call request is associated with the user's desire to make a call with a contact.

In the present embodiment, a plurality of slots are preset in the server. A position where a word appears may be referred to as one slot, and the values in one slot may be multiple. By combining the values in each slot, a large number of different preset word combinations may be constructed. The server pre-stores a bulk of different preset word combinations, each preset word combination may represent a query intent, and each preset word combination is pre-bound with push information. For example, in all the slots preset by the server, the slot corresponding to an operation, the slot corresponding to a resource name, and the slot corresponding to a resource type are included. The value of the slot corresponding to the operation may include: I want to watch, I want to listen, open, play, and so on. The value of the slot corresponding to the resource name may include: a large number of resource names. The value of the slot corresponding to the resource type may include: news, video clip, music, and movie. The different values of the slot corresponding to the operation, the slot corresponding to the resource name, and the slot corresponding to the resource type may be combined to construct a plurality of preset word combinations. Each preset word combination may represent a query intent, and each preset word combination is pre-bound with push information. Whether the request input by the user corresponds to push information may be determined through whether the request input by the user matches a preset word combination, thereby whether a query intent is associated is determined. When the request input by the user matches a preset word combination, it may be determined that the request is bound with the push information bound by the preset word combination.

In the present embodiment, guiding information may be generated when it is determined that the request input by the user is associated with a plurality of query intents, and the guiding information may be used to guide the user to feedback to further clarify the query intent.

For example, the user inputs a piece of request, and the request matches with a plurality of preset word combinations pre-stored on the server. Each preset word combination is pre-bound with push information, and all matching preset word combinations pre-bound with push information containing a plurality of different types of push information. Then guiding information may be generated, for example, "Which type of information do you want to acquire?"

In the present embodiment, guiding information may be generated when it is determined that the request input by the user is not associated with a query intent, and the guiding information may be used to guide the user to determine whether to use other request to acquire push information.

For example, when the request input by the user does not match with any one of the preset word combinations representing a query intent pre-stored on the server, corresponding replacement may be performed when it is determined that, according to the historical interaction process, it may match with a preset word combination after replacing a word in the request with another word, to obtain new request. Then, guiding information may be generated, for example, generating "Do you want to input+new request."

As another example, a plurality of preset word combinations associated with the contact information of the user are pre-stored on the server, and the preset word combination includes: the name of the contact, and the phone number of the contact. A request input by the user includes a name Xiao Ming of a contact person. The server may determine that the request input by the user matches a preset word combination including the name Xiao Ming and Xiao Ming's phone number, and the guiding information "Do you want to call Xiao Ming?" may be generated.

In some alternative implementations of the present embodiment, the request input by the user is obtained based on voice recognition of a voice query input by the user. The user may input a voice query corresponding to the request in the terminal, and the terminal sends the voice query input by the user corresponding to the request to the server. The server may perform voice recognition on the voice query to obtain the request input by the user.

In some alternative implementations of the present embodiment, when the request input by the user includes an entity keyword, push information of a plurality of resource types of an entity represented by the entity keyword is pre-stored on the server, and push information of each resource type is respectively bound to a preset word combination containing the entity keyword, it may be determined that the request input by the user matches the preset word combination respectively bound to the push information of each of the resource type, and it may be determined that the request input by the user is associated with a plurality of query intents. Then guiding information may be generated, and the guiding information is used to guide the user to select at least one type from the plurality of resource types of the entity represented by the entity keyword.

For example, the user inputs a voice corresponding to the request "sweet honey". Only the entity keyword "sweet honey" is included in the request. After receiving the voice sent by the terminal, the server determines, by voice recognition, that the request input by the user is "sweet honey". The server may determine that the entity "sweet honey" has push information in both the video library and the music library. The resource types of this entity "sweet honey" include resource types such as movie and music. The push information may include a resource name, a play address of the resource, and the like. The server determines that the request input by the user is associated with a query intent of watching the movie "sweet honey" or a query intent of listening to the music "sweet honey", etc. The server may generate the guiding information "I have the movie 'sweet honey' and the music 'sweet honey', which one do you prefer?" The server sends the guiding information "I have the movie 'sweet honey' and the music 'sweet honey', which one do you prefer?" to the terminal. After receiving the guiding information, the terminal presents the guiding information "I have the movie 'sweet honey' and the music 'sweet honey', which one do you prefer?" to the user.

In some alternative implementations of the present embodiment, when it is determined that the request input by the user does not correspond to push information, that is, it is determined that the request input by the user is not associated with a query intent, and a plurality of words with higher weights in the request input by the user appear in a preset word combination, at this time, it may be further determined that the request input by the user is incomplete. Guiding information may be generated, and the guiding information is used to guide the user to input feedback, to combine the feedback and the request to form the intent-clear request. In other words, the guiding information is used to guide the user to continue to input the feedback. After the guiding information is fed back to the user, the user may continue to input the feedback, and the feedback and the request may be combined to form intent-clear request bound with push information.

When it is determined that the request input by the user does not correspond to push information, that is, it is determined that the request input by the user is not associated with a query intent, and the request input by the user includes only a preset operation keyword and does not include an operation object keyword corresponding to the preset operation keyword, it may be further determined that the request input by the user is incomplete. Then guiding information may be generated, and the guiding information is used to guide the user to continue to input the operation object keyword corresponding to the preset operation keyword as the feedback.

For example, the user inputs the request "I want to watch", and the request includes only the preset operation keyword "I want to watch". The server may determine that a plurality of preset word combinations containing "I want to watch" bound with push information are pre-stored, but the content following "I want to watch" is empty. The server may determine that the request input by the user is incomplete. The server may generate the guiding information "I didn't hear it, what do you want to watch?". The server sends the guiding information "I didn't hear it, what do you want to watch?" to the terminal. After receiving the guiding information, the terminal presents the guiding information "I didn't hear it, what do you want to watch?" to the user. The user may input, as the feedback, a voice corresponding to an operation object keyword such as "Idol Trainee Video" corresponding to the "I want to watch". The terminal sends the voice to the server. After performing voice recognition, the server determines that the feedback input by the user is an operation object keyword corresponding to the "I want to watch", such as "Idol Trainee Video".

In some alternative implementations of the present embodiment, when it is determined that the request input by the user does not correspond to push information, that is, it is determined that the request input by the user is not associated with a query intent, and it is determined that a request similar to the request input by the user is bound with push information, guiding information may be generated, and the guiding information is used to guide the user to determine whether the request similar to the request input by the user is used as the intent-clear request to acquire the push information.

For example, the user inputs a voice corresponding to the request "ouxiang trainee video". After receiving the voice sent by the terminal for voice recognition, the server determines that the user inputs the request "ouxiang trainee video". After {ouxiang trainee, video} is obtained by word segmentation, it is determined that there is no preset word combination matching with {ouxiang trainee, video}. The server may calculate semantic similarities between the {ouxiang trainee, video} and preset word combinations bound with push information, and find from the preset word combinations bound with the push information based on the calculated semantic similarity, preset word combinations including {Idol Trainee, Video} and being semantically similar to the {ouxiang trainee, video}. The preset word combinations including the {Idol Trainee, Video} are bound with push information, and the push information includes: the play address and interface of a video of the Idol Trainee. The server may generate the guiding information "You are saying that I want to watch a video of the Idol Trainee, right?", and send the guiding information "You are saying that I want to watch a video of the Idol Trainee, right?" to the terminal. After receiving the guiding information sent by the server, the terminal presents the guiding information "You are saying that I want to watch a video of the Idol Trainee, right?" to the user.

Step 202, generating, based on the request and a feedback input by the user corresponding to the guiding information, an intent-clear request, and feeding back push information bound with the intent-clear request to the user.

In the present embodiment, when it is determined that the request input by the user is associated with a plurality of query intents, guiding information is generated. After the guiding information is fed back to the user, the user may input a feedback corresponding to the guiding information. Then, an intent-clear request may be generated based on the request and the feedback input by the user corresponding to the guiding information, and push the information bound with the intent-clear request may be fed back to the user. The intent-clear request is bound with push information.

For example, the user inputs a piece of request, the request being matched with a plurality of preset word combinations representing query intents pre-stored on the server, each of the preset word combinations being pre-bound with push information. Each preset word combination is pre-bound with a plurality of different types of push information in the push information. Guiding information "Which type of information do you want to acquire?" may be generated. After the guiding information is fed back to the user, a feedback input by the user may be received. The feedback may be the name of the type that the user inputs and desires to acquire, and the feedback may be combined with the request input by the user to form an intent-clear request bound with push information. Further, the push information may be acquired using the intent-clear request, and the push information may be pushed to the user.

In the present embodiment, when it is determined that the request input by the user is not associated with a query intent, guiding information may be generated to guide the user to determine whether to use other request to acquire push information. After the guiding information is fed back to the user, the user may input a feedback. The feedback may be information indicating affirmation or information indicating disavowal. The intent-clear request may be generated based on the request and the feedback input by the user.

For example, when the request input by the user is not matched with any one of the preset word combinations representing a query intent pre-stored on the server, corresponding replacement may be performed when it is determined that, according to the historical interaction process, it may match with a preset word combination after replacing a word in the request with another word. Then, guiding information may be generated, for example, generating the guiding information "Do you want to input+new request". After the guiding information is fed back to the user, the user may input a word indicating affirmation such as "Yes" or a word indicating disavowal such as "No". If it is determined that the feedback input by the user is a word indicating affirmation, the new request may be directly determined as an intent-clear request.

In the present embodiment, when the request input by the user includes an entity keyword, after determining that the request input by the user is associated with a plurality of query intents, guiding information may be generated, the guiding information being used to guide the user to select at least one type from the plurality of resource types of the entity represented by the entity keyword. After the guiding information is fed back to the user, a feedback input by the user may be received, and the feedback may be the name of the resource type selected from the plurality of resource types of the entity represented by the entity keyword. The server may combine the name of the selected resource type as the feedback with the entity represented by the entity keyword, to form the intent-clear request bound with push information. Further, the push information may be acquired through the intent-clear request, and the push information may be pushed to the user.

For example, the user inputs a voice corresponding to the request "sweet honey". After receiving the voice sent by the terminal, the server determines, by voice recognition, that the request input by the user is "sweet honey". The server may determine that the entity "sweet honey" has push information in both the video library and the music library. The push information may include a resource name, a play address of the resource, and the like. The server determines that the request input by the user is associated with a query intent of watching the movie "sweet honey" or a query intent of listening to the music "sweet honey", etc. The server may generate the guiding information "I have the movie 'sweet honey' and the music 'sweet honey', which one do you prefer?" The server sends the guiding information "I have the movie 'sweet honey' and the music 'sweet honey', which one do you prefer?" to the terminal. After receiving the guiding information, the terminal presents the guiding information "I have the movie 'sweet honey' and the music 'sweet honey', which one do you prefer?" to the user. The user may input a voice corresponding to "movie" or a voice corresponding to "music". The terminal sends the voice corresponding to "movie" or the voice corresponding to "music" to the server. The server determines that feedback input by the user is "movie" or "music", and "sweet honey" may be combined with "movie" or "music" to form the intent-clear request, and then push information corresponding to the movie named "sweet honey" or push information corresponding to the song named "sweet honey" may be acquired.

In the present embodiment, when it is determined that the request input by the user is not associated with a query intent, and it is determined that the request input by the user is incomplete, guiding information may be generated, and the guiding information being used to guide the user to input a feedback to combine with the request, to form an intent-clear request. In other words, the guiding information is used to guide the user to continue to input the feedback. After the guiding information is fed back to the user, the user may continue to input the feedback, and the feedback and the request may be combined to form the intent-clear request bound with push information.

For example, the user inputs the request "I want to watch", and the request includes only the preset operation keyword "I want to watch". The server may determine that a plurality of preset word combinations containing "I want to watch" bound with push information are pre-stored, but the content following "I want to watch" is empty. The server may determine that the request input by the user is incomplete. The server may generate the guiding information "I didn't hear it, what do you want to watch?". The server sends the guiding information "I didn't hear it, what do you want to watch?" to the terminal. After receiving the guiding information, the terminal presents the guiding information "I didn't hear it, what do you want to watch?" to the user. The user may input, as the feedback, a voice corresponding to an operation object keyword such as "Idol Trainee Video" corresponding to the "I want to watch". The terminal sends the voice to the server. After performing voice recognition, the server determines that the feedback input by the user is an operation object keyword corresponding to the "I want to watch", such as "Idol Trainee Video". The server may combine the "I want to see" with the continuously input feedback to form the intent-clear request bound with push information.

In the present embodiment, when it is determined that the request input by the user does not correspond to push information, that is, it is determined that the request input by the user is not associated with a query intent, and it is determined that a request similar to the request input by the user is bound with push information, guiding information may be generated. The guiding information is used to guide the user to determine whether the request semantically similar to the request input by the user is used as the intent-clear request to acquire push information.

For example, the user inputs a voice corresponding to the request "ouxiang trainee video". After receiving the voice sent by the terminal for voice recognition, the server determines that the user inputs the request "ouxiang trainee video". After {ouxiang trainee, video} is obtained by word segmentation, it is determined that there is no preset word combination matching with {ouxiang trainee, video}. The server may calculate semantic similarities between the {ouxiang trainee, video} and preset word combinations bound with push information, and find from the preset word combinations bound with the push information based on the calculated semantic similarity, preset word combinations including {Idol Trainee, Video} and being semantically similar to the {ouxiang trainee, video}. The preset word combinations including the {Idol Trainee, Video} are bound with push information, and the push information includes: the play address and interface of a video of the Idol Trainee. The server may generate the guiding information "You are saying that I want to watch a video of the Idol Trainee, right?", and send the guiding information "You are saying that I want to watch a video of the Idol Trainee, right?" to the terminal. After receiving the guiding information sent by the server, the terminal presents the guiding information "You are saying that I want to watch a video of the Idol Trainee, right?" to the user. The user may input a voice corresponding to a word indicating affirmation, for example, a voice corresponding to "Yes" or a voice corresponding to a word indicating disavowal, for example, a voice corresponding to "No". After performing voice recognition, the server determines that the feedback input by the user is a word indicating affirmation or a word indicating disavowal. If it is determined that the feedback input by the user is a word indicating affirmation, the preset word combinations including {Idol Trainee, Video} may be directly determined as the intent-clear request.

Figure 3:
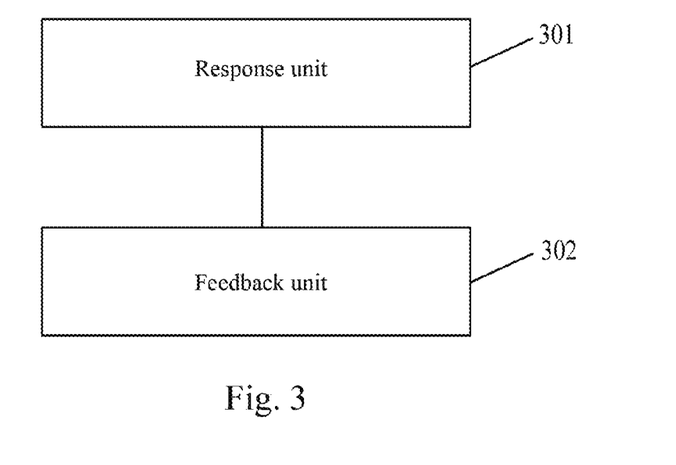
FIG. 3 illustrates a schematic structural diagram of an embodiment of an interaction apparatus according to the present disclosure.

With further reference to FIG. 3, as an implementation of the method shown in the above figures, the present disclosure provides an embodiment of an interaction apparatus, and the apparatus embodiment corresponds to the method embodiment as shown in FIG. 2.

As shown in FIG. 3, the interaction apparatus of the present embodiment includes: a response unit 301 and a feedback unit 302. The response unit 301 is configured to generate, in response to determining that request input by a user satisfies a guiding condition, guiding information, and feed the guiding information back to the user, the guiding condition including one of the following: associating with a plurality of query intents, or associating with no query intent. The feedback unit 302 is configured to generate, based on the request and a feedback input by the user corresponding to the guiding information, an intent-clear request, and feedback push information bound with the intent-clear request to the user.

In some alternative implementations of the present embodiment, the request includes one of the following: an information query request, a multimedia content request, or a call request.

In some alternative implementations of the present embodiment, the guiding condition includes: the associating with the plurality of query intents, and the request includes: an entity keyword, and the guiding information is used to guide the user to select at least one resource type from resource types of an entity represented by the entity keyword.

In some alternative implementations of the present embodiment, the guiding condition includes: the associating with no query intent, and the guiding information is used to guide the user to continue to input the feedback, to combine the feedback and the request to form the intent-clear request.

In some alternative implementations of the present embodiment, the request includes: a preset operation keyword, and the feedback includes: an operation object keyword corresponding to the preset operation keyword.

In some alternative implementations of the present embodiment, the guiding condition includes: the associating with no query intent, and the guiding information is used to guide the user to determine whether to use a request semantically similar to the request input by the user as the intent-clear request.

In some alternative implementations of the present embodiment, the request is obtained based on performing voice recognition on a voice query input by the user, and the feedback is obtained based on performing voice recognition on a feedback voice input by the user.

Figure 4:
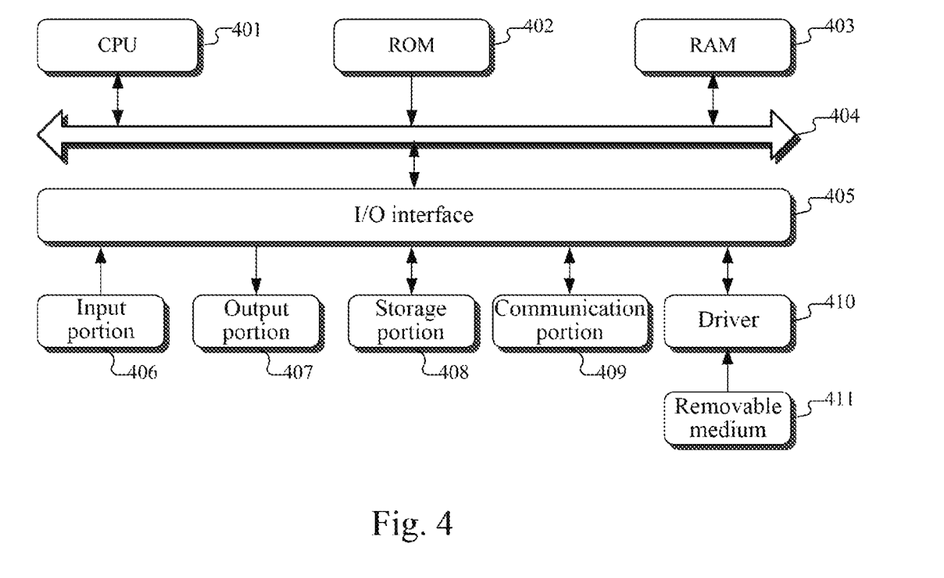
FIG. 4 is a schematic structural diagram of a computer system adapted to implement a terminal of the embodiments of the present disclosure.

FIG. 4 illustrates a schematic structural diagram of a computer system adapted to implement a terminal of the embodiments of the present disclosure.

As shown in FIG. 4, the computer system includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the computer system. The CPU 401, the ROM 402 and the RAM 403 are connected to each other through a bus 404. An input/output (I/O) interface 405 is also connected to the bus 404.

The following components are connected to the I/O interface 405: an input portion 406; an output portion 407; a storage portion 408 including a hard disk and the like; and a communication portion 409 including a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to the embodiments of the present disclosure, the process described above may be implemented in a computer program. For example, an embodiment of the present disclosure includes a computer program product, which includes a computer program that is tangibly embedded in a computer-readable medium. The computer program includes instructions for performing the method as illustrated in the flow charts. The computer program may be downloaded and installed from a network via the communication portion 409, and/or may be installed from the removable medium 411. The computer program, when executed by the central processing unit (CPU) 401, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. Amore specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable medium may be any physical medium containing or storing programs which may be used by a command execution system, apparatus or element or incorporated thereto. In the present disclosure, the computer readable storage medium may be any tangible medium that may contain or store a program, which may be used by or in conjunction with an information execution system, apparatus or element. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, an information execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable information for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. An interaction method, the method comprising:
generating, in response to determining that a request input by a user satisfies a guiding condition, guiding information, and feeding back the guiding information to the user, the guiding condition comprising one of: associating with a plurality of query intents, or associating with no query intent; and
generating, based on the request and a feedback input by the user corresponding to the guiding information, an intent-clear request, and feeding back push information bound with the intent-clear request to the user.

2. The method according to claim 1, wherein the request comprises one of: an information query request, a multimedia content request, or a call request.

3. The method according to claim 2, wherein the guiding condition comprises: the associating with the plurality of query intents, and the request comprises: an entity keyword, and the guiding information is used to guide the user to select at least one resource type from resource types of an entity represented by the entity keyword.

4. The method according to claim 2, wherein the guiding condition comprises: the associating with no query intent, and the guiding information is used to guide the user to continue to input the feedback, to combine the feedback and the request to form the intent-clear request.

5. The method according to claim 4, wherein the request comprises: a preset operation keyword, and the feedback comprises: an operation object keyword corresponding to the preset operation keyword.

6. The method according to claim 2, wherein the guiding condition comprises: the associating with no query intent, and the guiding information is used to guide the user to determine whether to use a request semantically similar to the request input by the user as the intent-clear request.

7. The method according to claim 1, wherein the request is obtained based on performing voice recognition on a voice query input by the user, and the feedback is obtained based on performing voice recognition on a feedback voice input by the user.

8. The method according to claim 2, wherein the request is obtained based on performing voice recognition on a voice query input by the user, and the feedback is obtained based on performing voice recognition on a feedback voice input by the user.

9. An interaction apparatus, the apparatus comprising:
at least one processor; and
a memory storing instructions, the instructions when executed by the at least one processor, cause the at least one processor to perform operations, the operations comprising:
generating, in response to determining that request input by a user satisfies a guiding condition, guiding information, and feeding back the guiding information to the user, the guiding condition comprising one of: associating with a plurality of query intents, or associating with no query intent; and
generating, based on the request and a feedback input by the user corresponding to the guiding information, an intent-clear request, and feeding back push information bound with the intent-clear request to the user.

10. The apparatus according to claim 9, wherein the request comprises one of: an information query request, a multimedia content request, or a call request.

11. The apparatus according to claim 10, wherein the guiding condition comprises: the associating with the plurality of query intents, and the request comprises: an entity keyword, and the guiding information is used to guide the user to select at least one resource type from resource types of an entity represented by the entity keyword.

12. The apparatus according to claim 10, wherein the guiding condition comprises: the associating with no query intent, and the guiding information is used to guide the user to continue to input the feedback, to combine the feedback and the request to form the intent-clear request.

13. The apparatus according to claim 12, wherein the request comprises: a preset operation keyword, and the feedback comprises: an operation object keyword corresponding to the preset operation keyword.

14. The apparatus according to claim 10, wherein the guiding condition comprises: the associating with no query intent, and the guiding information is used to guide the user to determine whether to use a request semantically similar to the request input by the user as the intent-clear request.

15. The apparatus according to claim 9, wherein the request is obtained based on performing voice recognition on a voice query input by the user, and the feedback is obtained based on performing voice recognition on a feedback voice input by the user.

16. The apparatus according to claim 10, wherein the request is obtained based on performing voice recognition on a voice query input by the user, and the feedback is obtained based on performing voice recognition on a feedback voice input by the user.

17. A non-transitory computer readable storage medium storing a computer program, wherein the computer program, when executed by a processor, causes the processor to perform operations, the operations comprising:
   generating, in response to determining that a request input by a user satisfies a guiding condition, guiding information, and feeding back the guiding information to the user, the guiding condition comprising one of: associating with a plurality of query intents, or associating with no query intent; and
   generating, based on the request and a feedback input by the user corresponding to the guiding information, an intent-clear request, and feeding back push information bound with the intent-clear request to the user.

18. The medium according to claim 17, wherein the request comprises one of: an information query request, a multimedia content request, or a call request.

19. The medium according to claim 18, wherein the guiding condition comprises: the associating with the plurality of query intents, and the request comprises: an entity keyword, and the guiding information is used to guide the user to select at least one resource type from resource types of an entity represented by the entity keyword.

20. The method according to claim 18, wherein the guiding condition comprises: the associating with no query intent, and the guiding information is used to guide the user to continue to input the feedback, to combine the feedback and the request to form the intent-clear request.

* * * * *